United States Patent
Henton

(10) Patent No.: US 6,738,738 B2
(45) Date of Patent: May 18, 2004

(54) AUTOMATED TRANSFORMATION FROM AMERICAN ENGLISH TO BRITISH ENGLISH

(75) Inventor: Caroline G. Henton, Santa Cruz, CA (US)

(73) Assignee: Tellme Networks, Inc., Mountain View, CA (US)

( * ) Notice: Subject to any disclaimer, the term of this patent is extended or adjusted under 35 U.S.C. 154(b) by 673 days.

(21) Appl. No.: 09/745,371

(22) Filed: Dec. 23, 2000

(65) Prior Publication Data

US 2002/0173966 A1 Nov. 21, 2002

(51) Int. Cl.[7] .............................................. G06F 17/28
(52) U.S. Cl. ............................ 704/2; 704/227; 704/277
(58) Field of Search ............................... 704/2–10, 277, 704/227; 707/375

(56) References Cited

U.S. PATENT DOCUMENTS

| | | | | |
|---|---|---|---|---|
| 6,154,758 A | * | 11/2000 | Chiang | 715/541 |
| 6,188,984 B1 | * | 2/2001 | Manwaring et al. | 704/260 |
| 6,493,744 B1 | * | 12/2002 | Emens et al. | 709/203 |
| 6,618,697 B1 | * | 9/2003 | Kantrowitz et al. | 703/22 |

OTHER PUBLICATIONS

Humphries et al., The Use of Accent–Specific Pronunciation Dictionaries in Acoustic Model Training, 1998, IEEE, p. 317–320.*

Jeremy Smith, American British British American Dictionary, Mar. 6, 2000, Internet.*

* cited by examiner

*Primary Examiner*—Tãlivaldis Ivars Šmits
*Assistant Examiner*—Lamont M Spooner
(74) *Attorney, Agent, or Firm*—Bever, Hoffman & Harms, LLP; Jeanette S. Harms

(57) ABSTRACT

A method of transforming a voice application program designed for US English speakers to a voice application program for UK English speakers using a computer system is described. In one embodiment, scripts and grammars associated with the voice application program are converted from US-to-UK English. The process includes spelling normalization, lexical normalization, and pronunciation conversion (including where appropriate accounting for stress shifts). The result is necessary word pronunciations for speech recognition of UK English speaker (especially for proper nouns) as well as a script that has been conformed to use UK English spelling and lexical conventions. Additionally, the script can be annotated with pronunciations as a part of the process. Further, in one embodiment a web based interface to the conversion process is provided either standalone or as part of a voice application development environment.

16 Claims, 1 Drawing Sheet

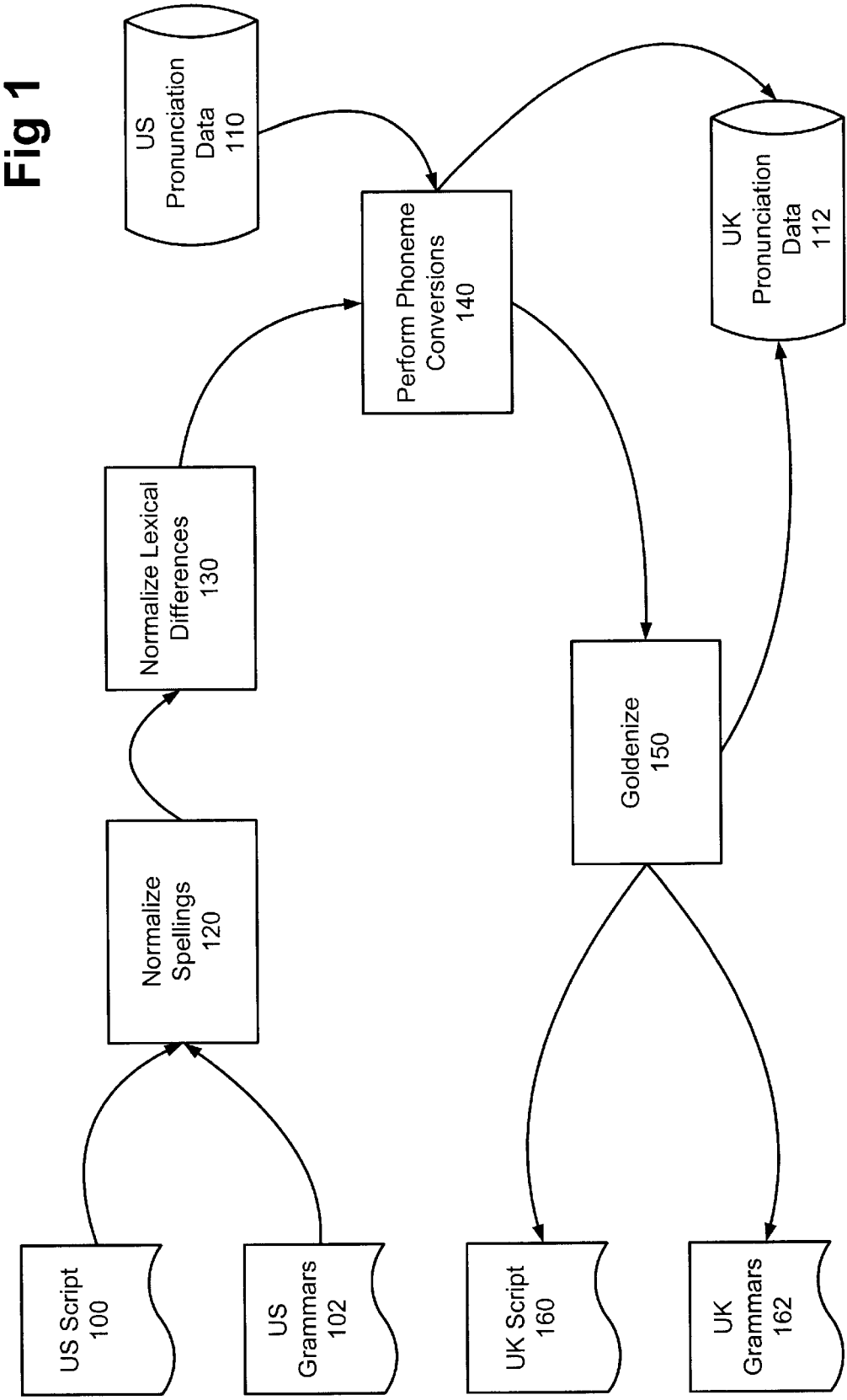

AUTOMATED TRANSFORMATION FROM AMERICAN ENGLISH TO BRITISH ENGLISH

BACKGROUND OF THE INVENTION

1. Field of the Invention

This invention relates to the field of phonetics. In particular, the invention relates to technologies for transforming pronunciations appropriate for American English into pronunciations appropriate for British English.

2. Description of the Related Art

A. Notation

Before turning to definitions, some notational concerns will be addressed. A standard notational alphabet, the International Phonetic Alphabet (IPA) can be used to represent the pronunciation of words using phonemes. However, the IPA uses symbols that are difficult to represent easily in ASCII systems and further many of the symbols lack appropriate representational glyphs in standard computer fonts. (Newer systems that handle Unicode can represent IPA symbols directly and frequently include newer fonts with appropriate glyphs for IPA symbols.) Accordingly, it is more convenient and has become industry standard practice to use the Computer Phonetic Alphabet (CPA) in computer speech recognition and pronunciation generation tools such as "autopron", from Nuance Communications, Menlo Park, Calif. and "namepro", from E-Speech Corporation, Princeton, N.J.

The CPA has the advantage that it can be represented using standard ASCII characters using the glyphs in commonly available fonts. The following tables show the correspondence between CPA and IPA symbols for American English and British English.

TABLE 1

American English: Computer Phonetic Alphabet (CPA) to International Phonetic Alphabet (IPA) Correspondence

| CPA | Example | IPA | CPA | IPA | CPA | IPA |
|---|---|---|---|---|---|---|
| Vowels | | | Stops | | Fricatives | |
| i | fleet | ★ | p | ★ | f | ★ |
| I | dimple | ★ | t | ★ | T | ★ |
| e | date | ★ | k | ★ | s | ★ |
| E | bet | ★ | b | ★ | S | ★ |
| a | cat | ★ | d | ★ | v | ★ |
| aj | side | ★ | g | ★ | D | ★ |
| Oj | toy | ★ | Flaps | | z | ★ |
| ˆ | cut | ★ | ! | ★ | Z | ★ |
| u | blue | ★ | Nasals | | h | ★ |
| U | book | ★ | m | ★ | Approximants | |
| o | show | ★ | n | ★ | j | ★ |
| O | caught | ★ | g~ | ★ | r | ★ |
| A | father, cot | ★ | Affricates | | w | ★ |
| aw | couch | ★ | tS | ★ | l | ★ |
| *r | bird | ★ | dZ | ★ | | |
| * | alive | ★ | | | | |

TABLE 2

British English: Computer Phonetic Alphabet (CPA) to International Phonetic Alphabet (IPA) Correspondence

| CPA | Example | IPA | CPA | IPA | CPA | IPA |
|---|---|---|---|---|---|---|
| Vowels | | | Stops | | Fricatives | |
| i | bean | ★ | p | ★ | f | ★ |
| I | bin | ★ | t | ★ | T | ★ |
| e | bane | ★ | k | ★ | s | ★ |
| E | bet | ★ | b | ★ | S | ★ |
| a | bat | ★ | d | ★ | v | ★ |
| A | father | ★ | g | ★ | D | ★ |
| @ | cot | ★ | Flaps | | z | ★ |
| O | caught | ★ | ! | ★ | Z | ★ |
| o | go | ★ | Nasals | | h | ★ |
| U | book | ★ | m | ★ | Approximants | |
| u | toot | ★ | n | ★ | j | ★ |
| ˆ | cup | ★ | g~ | ★ | r | ★ |
| 3 | bird | ★ | Affricates | | w | ★ |
| * | alive, rider | ★ | tS | ★ | l | ★ |
| aj | five | ★ | dZ | ★ | | |
| Oj | boy | ★ | | | | |
| aw | cow | ★ | | | | |
| i* | beer | ★ | | | | |
| e* | bear | ★ | | | | |
| u* | poor | ★ | | | | |

Throughout the remainder of this document, the CPA symbols will be used to represent phonemes in transcriptions. When relevant, transcriptions written in CPA symbols will be identified as corresponding to British English (UK) or American English (US) if it is not clear from the context and it is relevant to understanding the material. Additionally, to minimize confusion, US English conventions for spelling and style will be used throughout the body of this specification, except in examples and rules. Additionally, the UK CPA forms are used for Australian and New Zealand pronunciations.

The range of possible sounds that a human being can produce by moving the lips, tongue, and other speech organs, are called phones. These sounds are generally grouped into logically related groups, each a phoneme. In a given language only certain sounds are distinguished (or distinguishable) by speakers of the language, i.e. they conceptualize them as different sounds. These distinguishable sounds are phonemes. In fact, a phoneme may be defined as a group of related phones that are regarded as the same sound by speakers. The different sounds that are part of the same phoneme are called allophones (or allophonic variants).

Returning to notation issues, the phonemic transcription of a word will be shown between slashes ("/ /"). For clarity, the glyph "·" will be placed between each phoneme in the transcription, e.g./k·O·r·n·*r/ for "corner" (US), to represent the space character visibly. In many computer programs a space character is used to represent the boundary between phonemes; however, in a printed publication using the standard glyph for the space character, " ", might lead to ambiguities, e.g. between /*r/ and /*·r/ (US), etc.

If used, phonetic transcriptions will be shown in brackets ("[ ]"). Phonetic transcriptions distinguish between the different phones that are allophones of the phoneme.

B. Role of Phonemic Transcriptions in Speech Software

Speech recognizers (both speaker independent and speaker dependent varieties) rely on pronunciations to perform recognition. For example, in order for the Nuance™ speech recognition software from Nuance Communications, to recognize a word in a recognition grammar, a pronunciation (e.g. phonemic transcription) must be available. To support recognition, Nuance provides a large phonemic dictionary that includes pronunciations for many American English words. The content of the dictionary typically excludes proper nouns and made up words, e.g. "Kodak"; however, there may be extensions for particular purposes, e.g. for US equity issues (stocks).

Additionally, Nuance provides an automated tool, "autopron", that attempts to generate (simply from the spelling of the word) a usable pronunciation. Other companies, e.g. E-Speech, specialize in providing software that they claim can do a better job at generating such pronunciations.

Symmetrically, a good pronunciation is also important to producing good synthesized speech (or in the case where a human is reading a script, providing the human with extra guidance about the correct pronunciation). Thus, a useful phonemic transcription is important to many aspects of computer speech technology.

C. British English and American English

Although American English and British English share a common origin, there are significant differences in grammar (word choice, vocabulary, spelling, etc.), pronunciation, and text normalization (e.g. time formats, data formats, etc.). One can typically purchase an electronic dictionary of British English, e.g. for use in spell checking, or even a phonetic one for use with products such as the Nuance speech recognition system. However, such a pronunciation dictionary assumes that materials have already been prepared in British English form.

For example, given a particular word like "attorney" in a production script for a voice application (e.g. yellow pages), that was prepared for American English speakers there are several problems. First, if presented a list of options, "attorney" will sound awkward to a British native since they expect the term "solicitor" (or perhaps if trying to get out of gaol a "barrister"). Similarly, the native British speaker is unlikely to provide the verbal command "attorney" to the speech recognition system. Lastly, even if the British speaker did provide the word "attorney", the pronunciation will be different from the one used by Americans. This also has an impact on the recording of the program script where prompts for categories such as "attorneys" would need to be re-recorded.

These problems may be further exacerbated in the realm of proper nouns, e.g. names and places, as well as made up words, e.g. company names, movie/book titles, etc., where even if a British English dictionary were provided the term would not likely be present.

D. Noting Stress in CPA

Presently, (as seen above in Tables 1 and 2) the CPA does not support the representation of stress within a word. This limits its usefulness (as compared to IPA representations) in designating differences in pronunciation. For example "advertisement" is pronounced in US English with the stress on the penultimate syllable of the word, whereas UK English places the stress on the second syllable of the word. Shifting the stress changes the pronunciation.

Although present generation speech recognition systems (e.g. Nuance) do not make use of stress (see absence of the same from CPA, above) the stress information is essential for a voice talent performing a script and may potentially be useful in enhanced speech recognition.

E. Conclusion

Prior techniques for converting US English to UK English have required humans to perform textual normalization and pronunciation transformations. Accordingly, what is needed is a method and apparatus for automating the transformation.

Prior techniques for representing word pronunciations in ASCII characters have not supported indicating word stress. Accordingly, what is needed is a method and apparatus for indicating word stress in a fashion compatible with both US and UK CPA representations as well a method and apparatus for presenting a version of the pronunciations without word stress to incompatible speech synthesis and recognition systems.

Prior techniques for preparing voice application programs do not easily allow a script initially prepared for US English to be automatically converted to UK English. Accordingly, what is needed is a method and apparatus textually normalizing a document from US English to UK English and for refining a US English phonemic transcription using one or more well defined rules to produce more accurate transcriptions for UK English.

SUMMARY OF THE INVENTION

A naive assumption might be made that US and UK English are similar enough to allow a program designed for one market to simply be used in the other. Typically, due to its size, an application might be first prepared for the US market with later use in the UK (and possibly continental Europe where the UK variety of English is used). For a voice application, it is necessary to ensure that UK English pronunciations for all words are available to enable speech recognition and speech generation (both by text-to-speech and human voice talent.)

Accordingly, a method of transforming a voice application program designed for US English speakers to a voice application program for UK English speakers using a computer system is described. Automation allows what would otherwise be a tedious manual process to be highly automated and focuses human intervention (when needed) on correcting very specific points.

In one embodiment, scripts and grammars associated with the voice application program are converted from US-to-UK English. Three primary tasks can be completed in this process: spelling normalization, lexical normalization, and pronunciation conversion (including where appropriate accounting for stress shifts).

The converted script can be generated using the method and apparatus described herein and a preferred pronunciation from such effort inserted into the script in appropriate locations to assist the voice talent. For example, in one embodiment words with stress differences from the US English forms have their pronunciations listed in the script.

Similarly, the method and apparatus can be integrated into a remotely hosted development environment. This can allow developers who would otherwise be unlikely to have the resources and skill to convert their program independently to do so in a highly automated fashion. Additionally, any manual intervention can be focused on answering specific questions: what part of speech is this, etc. Further such questions are much more easily answered by a non-professional (in linguistics/phonetics) than the broader conversion questions.

BRIEF DESCRIPTION OF THE FIGURES

FIG. 1 is a process flow diagram for generating phonemic variations.

DETAILED DESCRIPTION

A. Introduction

The techniques described herein can be applied in several fashions. A most basic example, a list of US English words (with the pronunciations) could be transformed into their respective UK English orthographic forms (spellings) and pronunciations. Additionally, further textual normalization of the list can be performed to replace words not commonly used in Britain with their more common British substitute, e.g. "hoover" (UK) for "vacuum" (US), etc. As such, if a US English pronunciation dictionary has been purchased (e.g. for your speech recognition system), the above approach (minus word replacements) can be used to generate a UK English pronunciation dictionary from scratch.

However, the focus of the discussion will be on conversion of a program script for a voice application (and its associated grammars) originally prepared for US English into UK English. For purposes of this discussion it will be assumed that there is an appropriate US English pronunciation for all words in the program script. In a preferred embodiment, the original US program script and grammars are handled as described in U.S. patent application Ser. No. 09/721,373, entitled "Automated Creation of Phonemic Variations", filed Nov. 22, 2000, having inventor Caroline G. Henton. More specifically, in one embodiment, for each word in the program script and grammar there is a goldenized US English pronunciation (e.g. a pronunciation adopted as authoritative or golden).

It should also be noted that many of these rules could be sensibly applied to accomplish the reverse task: converting a UK English application to US English. However, since at present a larger portion of applications tend to be prepared first for US English and then "converted" or "internationalized" for UK English, the focus will be on the US-to-UK transformations.

The process of transforming a script and grammar from US-to-UK will now be described in greater detail with respect to FIG. 1. The process of FIG. 1 can be implemented using one or more computer systems with, or without, a direct human operator.

The process starts with a US script 100 and corresponding US grammars 102. The script portion corresponds to those pieces of text to be read by human voice talents or computer synthesized speech. The grammars correspond to those pieces of text that the computer expects the user of a voice application to say at various junctures. An example for a simple "hello world" application may be helpful. The US script 100 might contain a single line script: "Hello World, say Menu to return to the main menu" and the grammar file US grammars 102 would consist of a single choice "menu" in the appropriate grammar file format. In one embodiment, the grammars (e.g. US grammars 102 and UK grammars 162) are formatted according to the Nuance GSL language for grammars, in another embodiment, an XML grammar representation format is used. The words in scripts and grammars can be represented using one or more standard character sets (e.g. ASCII, Unicode, etc.) in one or more text encodings (e.g. ISO-8859, UTF-8, UTF-16, etc.).

The process begins at step 120 with the normalization of spellings. As described more fully below a number of straightforward rules can be applied to bring the US spelling close to the common UK spelling. Additionally, ad hoc rules can be provided as well (e.g. a list of exceptions with the correct form, e.g. "yogurt" (US) to "yoghurt" (UK).)

Next, lexical differences between the vocabularies can be adjusted at step 130. As noted above, words like "attorney" which are common in US English lack significant semantic meaning in UK English where the term "solicitor" is common. A set of sample rules covering a large range of common uses is presented along with a general approach for preparing (and handling) such lists. Additional lists can easily be prepared for specialized areas including: financial terms, units of measure, musical notation, automotive parts, betting terms, botanical and zoological names, food names, slang, and cricket terms. Note: stylistic differences, e.g. in the presentation of time, system of measurement, etc., will not addressed by lexical transformations. Thus, for example a set of measurements delivered in imperial units (as opposed to metric units) will not be flagged, however the use of terms like "quart" which is not used in the British imperial system will be flagged.

Next, at step 140 phonemic conversions to UK English are performed. This may (as shown in FIG. 1) result in the generation of the UK Pronunciation data 112. However, if a good source of UK pronunciation data is available the process may instead rely on such data. The process of step 140, as noted, relies on US pronunciation data 110 for the words in the US script 100 and the US grammars 102. This process will be discussed in more detail in conjunction with several rules for determining pronunciations for UK English from US English.

The final step, step 150, involves goldenizing the pronunciations (and scripts/grammars), that is selecting an approved transcription for use in the system. This process may be automated, manual, and/or a combination of the two. For example, transcriptions might automatically become available within the pronunciation data 112 prior to goldenization (e.g. after step 140); however, they could be flagged as such to avoid their use in secondary purposes, e.g. in the recording of a script. In the case of multiple transcriptions for a single word, goldenization may include selecting the golden, i.e. preferred, pronunciation for a word. The goldenized pronunciation is the one that should be used by automatic Text-to-Speech (TTS) processes and by human voice talents in reading scripts that contain words in the scripts (or other words for which pronunciations have been generated). Additional, variant, pronunciations remain useful for speech recognition purposes if they represent the common variant pronunciations for a word. Although goldenization is primarily discussed in the context of approving transcriptions, the UK script 160 (and UK grammars 162) outputs will also typically reviewed. In some embodiments, the step 130 may have flagged certain portions of the script or grammar for manual review (e.g. no easily determined semantic equivalent).

It should be noted that sometimes there is no substitute to having a human talk to a business establishment, or a local of a particular area, to determine the locally used pronunciation. For example, in Mountain View, Calif., there is a restaurant called "Vivaca" and none of the automated (or initial human) efforts to create the appropriate transcription were successful (due to the odd pronunciation the proprietor and locals use—that does not correspond to the apparent origin of the word). Thus, although the automated processes of step 120–150 significantly reduce the costs and likelihood of error in preparing a program for use in UK locales, some human oversight will always remain prudent.

B. Spelling Normalization

The following describes several spelling rules useful for application in conjunction with step 120. In some instances the rules may indicate a part of speech, in those instances the script/grammar may be flagged for manual treatment later. In another embodiment, exceptions of this type are manually reviewed by a human operator either as they arise or in batch. These embodiments allow step 130 to receive versions of the script with normalized orthography according to British English. In another embodiment, all errors from steps 120 and step 130 are handled prior to step 140. In another embodiment, the errors are only handled after step 140, but the process of FIG. 1 can be repeated in such a fashion as to allow the appropriate handling of just the necessary portions of the US script/grammars.

The following table lists regular spelling differences. The affected letters are noted in boldface with word-medial and word-final positions indicated with an elliptical hypen, e.g.—ae- and -re. Additionally, an upper case letter "C" represents any orthographic consonant.

TABLE 3

Consistent Spelling Differences

| # | US Spell. | Examples | UK Spell. | Examples |
|---|---|---|---|---|
| 1 | -ll | enthrall, fulfill, instill, fulfillment, installment, skillful | -l | enthral, fulfil, instil, fulfilment, instalment, skilful |
| 2 | -el | beveled, canceled, caroled, channeled, chiseled, counseled, crystaled, cudgeled, dialed, disheveled, doweling, dueled, emboweled, enameled, funneled, gamboled, graveled, groveled, imperiled, labeled, leveled, jeweled, libeled, marshaled, marveled, medaled, modeled, paneled, patroled, penciled, petaled, pommeled, propeled, quarreled, reveled, rivaled, shoveled, shriveled, signaled, sniveled, stenciled, totaled, toweled, trammeled, traveled, tunneled | -ell | bevelled, cancelled, carolled, channelled, chiselled, counselled, crystalled, cudgelled, dialled, dishevelled, dowelling, duelled, embowelled, enamelled, funnelled, gambolled, gravelled, grovelled, imperilled, labelled, levelled, jewelled, libelled, marshalled, marvelled, medalled, modelled, panelled, patrolled, pencilled, petalled, pommelled, propelled, quarrelled, revelled, rivalled, shovelled, shrivelled, signalled, snivelled, stencilled, totalled, towelled, trammelled, travelled, tunnelled |
| 3 | -er | caliber, center, centimeter, fiber, kilometer, liter, meter, miter, niter, ocher, reconnoiter, saber, sepulcher, specter, theater | -re | calibre, centre, centimetre, fibre, kilometre, litre, metre, mitre, nitre, ochre, reconnoitre, sabre, sepulchre, spectre, theatre |
| 4 | -e- | anesthetic, archeology, cesarean, dieresis, encyclopedia, etiology, esthete, feces, hemorrhage, medieval, peon | -ae- | anaesthetic, archaeology, caesarean, diaeresis, encyclopaedia, aetiology, aesthete, faeces, haemorrhage, mediaeval, paeon |
| 5 | -e- | ameba, diarrhea, edema, esophagus, fetus, maneuver, phenix | -oe- | amoeba, diarrhoea, oedema, oesophagus, foetus, manoeuvre, phoenix |
| 6 | -g | analog, catalog, demagog, dialog, homolog, monolog, pedagog, travelog | -gue | analogue, catalogue, demagogue, dialogue, homologue, monologue, pedagogue, travelogue |
| 7 | -ize | analyze, apologize, colorize, galvanize, localize, metalize, pulverize, recognize, summarize, televize, tranquilize | -ise | analyse, apologise, colorise, galvanise, localise, metalise, pulverise, recognise, summarise, televise, tranquillise |
| 8 | -C | amid, among, while | -Cst | amidst, amongst, whilst |
| 9 | -g- | fagot (bundle of sticks), wagon | -gg- | faggot, waggon |
| 10 | -m | gram, program | -mme | gramme, programme |
| 11 | -se | defense, license, offense, practise, pretense (all when used as nouns) | -ce | defence, licence, offence, practice, pretence |
| 12 | -o- | mold, molt, smolder | -ou- | mould, moult, smoulder |
| 13 | -or | arbor, armor, behavior, candor, clamor, color, demeanor, enamor, favor, flavor, humor, neighbor, odor, parlor, savior, valor, vapor | -our | arbour, armour, behaviour, candour, clamour, colour, demeanour, enamour, favour, flavour, humour, neighbour, odour, parlour, saviour, valour, vapour |
| 14 | in- | incase, inclose, indorse, inquire, insure, inure | en- | encase, enclose, endorse, enquire, ensure, enure |
| 15 | -dg- | abridgment, acknowledgment, judgment | -dge- | abridgement, acknowledgement, judgement |
| 16 | -ction | connection, deflection, inflection, retroflection | -xion | connexion, deflexion, inflexion, retroflexion |

Comments on Table 3:

Rule 1: Note that even when a word appears in additional forms, e.g. "install" appearing as "installment", the spelling change occurs and the UK spelling is "instalment".

Rule 2 is exemplified using the past participle, but it also applies to several other inflections of the base morpheme, +ing, +ous, +er, thus: marveling (US)→marvelling (UK); marvelous→marvellous; marveled→marvelled; marveler→marveller.

Rules 4 and 5 indicate the UK preference for, and retention of, the original Greek spelling, with or without the use of digraphs. These rules will impact especially the alphabetical ordering of entries that have initial æ- or initial œ- in UK English. This rule may be difficult to apply in automated fashion, in some embodiments, word etymologies are consulted for the source words in the US script/grammar to determine whether these rules should be applied. In other embodiments, they are flagged for manual review.

Also, rule 5 demonstrates that sometimes more than one rule may apply, e.g. "maneuver" (US) becomes "manoeuvre" (UK) since both rule 3 and rule 5 apply.

Rule 7 shows a continued preference for the -ise spelling in UK English dictionaries, but -ize is appearing progressively more frequently as a variant in UK publications and press. Contemporary dictionary entries now list -ize as an alternative. In uncertain cases, it might be useful to employ the Canadian system, which has -ize when the root is transparent (e.g. "capitalize" and "glamorize"), and -ise when the stem is opaque (e.g. "apologise" and "realise").

Rule 8 applies to a very few words, and the different spellings are reflected in the pronunciations.

Rule 9 applies to a very few words. Oddly, US English retained the double-g in the slang word "faggot" used to refer (oft times in a derogatory fashion) to homosexuals.

Rule 10 applies to the metric units: milligramme, centigramme, gramme, and kilogramme, as well as words like programme. The rule also applies to their respective derived forms. Oddly, the rule does not apply to the word "telegram" which is the same in US and UK English.

Rule 11 serves in UK English to differentiate orthographically the noun-form from the verb-form in pairs of words which in US English have become homographic. Because rule 11 requires identification of the part of speech, verb/noun, it may be necessary to manually review the script to identify the appropriate form. In some embodiments, the script is flagged to indicate the need for manual review at that point in the script/grammar but the US English form is left in place.

Rule 12 operates on a restricted set of words, c.f. "boulder" and "shoulder" where US English retained the UK English spelling.

Rule 13 should be applied with care so as not to replace the agentive marker -or in names or places, e.g. "actor", "governor", "Bangor".

Rule 14 is not universal in its application. Some words like "inquire" are used in both varieties; and "envelope" and "incur" do not have variants.

Rule 16 "inspection" and "complexion" are standard in both UK and US varieties.

Additionally a number of ad hoc spelling differences can be noted and corrected:

| US Spelling | UK spelling |
| --- | --- |
| acommodations* | accommodation |
| aluminum | aluminium |
| all right (adv.)† | alright |
| appal | appall |
| busses or buses | buses |
| catsup | ketchup |
| check | cheque |
| chilli | chili (con came) |
| curb | kerb |
| czar | tsar |
| gage or gauge | gauge |
| hiccup | hiccough |
| gray | grey |
| jail | gaol |
| jewelry | jewellery |
| kidnaped | kidnapped |
| licorice | liquorice |
| likable | likeable |
| mustache | moustache |
| pajamas | pyjamas |
| plow | plough |
| skeptic | sceptic |
| story | storey (building) |

-continued

| US Spelling | UK spelling |
| --- | --- |
| sulfur | sulphur |
| tire | tyre |
| veranda | verandah |
| whisky | whiskey |
| woolen, wooly | woollen, woolly |
| worshiping | worshipping |
| yogurt | yoghurt |

The (second) variant of "acommodations", with one "c" for US English is not listed in UK English dictionaries, and is regarded as wrong. Notice also that US English uses a (unjustified by comparison with other Indo-European languages) plural form for what is normally classified as an uncountable noun.

With respect to "all right" (US), the *American Heritage Dictionary of the English Language* (1981) states that "alright" is a "common misspelling" for the adverbial form "all right"; whereas UK English proscribes "all right" except as a pronoun+adjective string.

This concludes the focus on orthographic changes to words and we turn now to lexical normalization.

C. Lexical Normalization

Lexical normalization accounts for the divergence in vocabularies between US and UK English. These divergences are believed to have occurred for four primary reasons:

1. Necessity for expansions in US English to describe new objects and experiences, achieved either by adaptation of existing UK English words, or neologisms.

2. Technological and cultural developments causing diversion in: food items, terms for car parts, sports, and educational institutions 3. Borrowing from different language sources, e.g. American Indian, African languages, (South American) Spanish, and Yiddish for US English.

4. Independent linguistic change within each variety, whereby some archaisms are preserved or given new meanings, or, conversely, are lost.

See TRUDGILL, P. and HANNAH, J. (1994) International English: a Guide to Varieties of *Standard English*. London, Edward Arnold. pp. 87–89.

Other strong influences may have included the puritanical conservative influence of "WASPs" (white Anglo-Saxon protestants), who have promoted the use of euphemism in US English, to avoid reference to alcohol, sexual connotations and bodily functions. For example, see the entries below for "rooster", "beverage", and "washroom".

As noted previously, the following list is not exhaustive, specialized lists focusing on financial terms, units of measure, musical notation, automotive terms, betting terms, botanical and zoological terms, food names, slang, cricket, and traffic can be obtained in fairly comprehensive form from sources such as SCHUR, N. W. (1987) *British English A to Zed*. New York, Harper Collins, Appendix II.

Items marked with an asterisk ("*") are probable additions to (or aliases from) an existing US dictionary. Where a dash appears ("-") it indicates that there is no cultural/semantic equivalent in the two linguistic societies.

| US version | UK version |
| --- | --- |
| — | a-road |
| academician | academic* |
| acclimate | acclimatise* |
| ad | advert* |
| adjuster | assessor* |
| housing project | council house |
| antenna | aerial |
| apartment | flat* |
| attorney | solicitor* |
| automobile | car |
| — | B-road |
| baby buggy | pram (perambulator)* |
| ballpoint | biro* |
| baloney, bologna | — |
| bangs | fringe* |
| barrette | hairclip* |
| bathe (v. trans.) | bath (v. trans.)* |
| bathroom | loo |
| beets | beetroot* |
| beverage | drink |
| big rig | juggernaut/eighteen wheeler |
| biscuit | scone* |
| — | blackspot |
| bookstore | bookshop, bookseller |
| braid | plait* |
| bread box | bread bin |
| broil (v.) | grill (v.) |
| buffet | sideboard* |
| — | butty |
| calendar | diary |
| candidacy | candidature* |
| candy | sweets* |
| centennial | centenary* |
| check | bill |
| checkers | draughts* |
| cigarettes | fags |
| chips | crisps* |
| closet | cupboard*, wardrobe* |
| club soda | soda (water) |
| collectible | collectable*, etc. |
| (ice-cream, etc.) cone | cornet |
| cotton candy | candyfloss* |
| cord | lead (lliyd) |
| counter-clockwise | anti-clockwise* |
| court sessions | assizes* |
| cracker | cheese biscuit |
| crosswalk | zebra crossing |
| decal | transfer (n.) |
| derby (hat) | bowler (hat)* |
| diaper | nappy* |
| disoriented | disorientated*, etc. |
| drapes | curtains* |
| drugstore | — |
| eggplant | aubergine* |
| elevator | lift* |
| endive | chicory* |
| fall (n.) | autunm* |
| faucet | tap* |
| fire-truck | fire-engine* |
| flashlight | torch* |
| French fries | chips* |
| funeral home | funeral parlour* |
| garbage can, trashcan | dustbin* |
| garter | suspender* |
| gasoline | petrol* |
| German shepherd | Alsation* |
| gotten (past part.) | got (past part.) |
| government employee | civil servant* |
| freeway | — |
| highway | — |
| thruway | — |
| expressway | — |
| — | motorway* |
| hamburger (meat) | mince* |
| hardware store | ironmonger's* |
| hood | bonnet (of car)* |
| (life) insurance | (life) assurance |
| jackhammer | pneumatic drill* |
| jello | jelly |
| jelly | jam |
| kerosene | paraffin* |
| kitty corner (to) | diagonally opposite |
| kleenex (used generically) | tissue |
| — | lay-by |
| leash | lead |
| liquor store | off-licence* |
| mail (n. and v.) | post |
| mailbox | pillar-box* |
| math | maths* |
| molasses | treacle* |
| mortician | undertaker* |
| movie house/theater | cinema |
| (the) movies | (the) pictures |
| muffler | silencer (car) |
| napkin | serviette |
| noon | midday |
| outlet/socket | power point* |
| overalls | dungarees* |
| pants | trousers* |
| pantyhose | tights |
| parakeet (small) | budgerigar* |
| parking lot | car-park* |
| pedestrian crossing | zebra crossing |
| pharmacy | chemist's (shop) |
| (couch) pillow | cushion* |
| pillow-sham | — |
| pin | brooch* |
| pitcher | jug |
| plaid | tartan* |
| prom | — |
| (nail) polish | (nail) varnish |
| pudding | custard |
| pullman car | sleeping car |
| purse | handbag* |
| realtor | estate agent* |
| realty | property/estate |
| reformatory | borstal* |
| restroom, washroom | toilet |
| retainers (dental) | braces |
| resumé | c.v. (curriculum vitae) |
| rooster | cock(erel)* |
| rutabaga | swede* |
| school | university/college |
| sedan (car) | saloon (car) |
| (shopping) cart | (shopping) trolley* |
| (sales) clerk | (sales) assistant |
| sheers | net curtains* |
| sidewalk | pavement |
| slick | slippery |
| sneakers | trainers* |
| soda | fizzy drink/pop |
| sorbet | sherbet* |
| specialty | speciality* |
| squash (vegetable) | — |
| — | marrow (vegetable) |
| sports | athletics |
| station wagon | estate car* |
| stick-shift | manual |
| storage room | box room* |
| store | shop |
| stove | cooker* |
| subway | underground railway* |
| suspenders | braces |
| sweater | jumper |
| swimsuit | bathing costume* |
| taffy | toffee* |
| t.v. | tele* |
| telephone booth | telephone kiosk*/box |
| tow truck | breakdown van* |
| tractor trailer | juggernaut |
| traffic post | bollard* |
| trailer/camper/mobile home | caravan* |
| trailer truck, tractor-trailer | articulated lorry* (alt. artic) |
| transportation (n.) | transport (n.)* |

-continued

| US version | UK version |
|---|---|
| trash, garbage | rubbish* |
| trial lawyer | barrister* |
| truck | lorry* |
| trunk | boot (of car)* |
| tuxedo | dinner jacket* |
| undershirt | vest |
| underpants (women's) | knickers* |
| vacation | holiday(s)* |
| vacuum-cleaner | hoover (n. & v.)* |
| vest | waistcoat |
| windshield | windscreen* |
| wrench | spanner |
| xerox | photocopy* |
| yard | garden |
| zipper | zip* |
| zucchini | courgettes* |

With respect to the word "beverage", the usage in US English is assumed to have origins in puritanical and/or prohibitionist euphemism, where the standard English term for liquid refreshment, "drink", became tainted with the implied meaning "with alcohol". In the UK and Australia, the term "beverage" is considered archaic, and is more likely to refer to hot chocolate, tea, and soft drinks. See also, Trudgill at pp. 87–93 (discussing origins and examples of lexical items with no correspondences, or that have different, or additional meanings in the two varieties.)

The range of tables of lexical equivalents provided can be determined based on the problem domain. For example, a stock trading phone application prepared in the US should be converted by the process of FIGURE when the lexical tables (of the sort above) for financial terms that are different between US and UK English are available to the computer program.

When parts of speech are noted, the script/grammar/ words can be flagged for manual review. Also, when there is additional context information necessary to make the lexical determination, e.g. for underpants (women's)→knickers, the word can be flagged for manual review.

We now turn to pronunciations and conversion phonemic transcriptions from US to UK English.

D. Phonemic Conversion

1. Vowels

A general post-vocalic r-dropping rule is required to convert from US to UK English pronunciations. This rule applies to monophthongs, diphthongs and triphthongs. In many instances, the orthographic spelling of a vowel followed by the letter "r" is represented in UK English by the vowel schwa (/*/ in CPA) alone. In other cases, there is a complete change of vowel quality. In the list below any vowel is represented with V, and the symbol "#" indicates a syllable boundary (# is not used in CPA; however it is shown here to reflect the different vocalic qualities of the word). Word-medial and word-final positions are indicated with an elliptical hyphen (-). Where no hyphen appears, this means the pronunciation change occurs in all lexical positions.

| US CPA | UK CPA | Example Words |
|---|---|---|
| | R-Dropping (Vr => Vv, V or *) | |
| i·r | i·* | here, hear, peer |
| I·r | I·#r | mirror, pirouette, spirit |
| E·r | e* | hair, bear, care |
| A·r | A | hard, bar, car |
| aw·r | aw·* | hour, bower, cower |
| aj·r | aj·* | hire, lyre, liar, choir |
| -aj·r | -* or -i* | Shropshire, etc. (N.B. speaker style dependent, may use both variations with -* preferred.) |
| O·r | O | hoard, lord, chord |
| U·r | u* | boor, dour, lure, poor, you're |
| *r | * | heard, bird, fur, for, word, worker, hitter, butter, mother, worker |
| E·r | a·r | harrow, barrel, carol |
| -*r- | -^·r- | borough, burrow, concurrent, currency, currant, courage, Durham, flourish, furrow, furrier, hurry, hurricane, murrain, nourish, occurrence, scurry, slurry, surrogate, thorough, turret, worry |
| -*r- | -u*·r- | courier, mercury, obdurate, tournament, tourniquet |
| -O·r | -A | abattoir, reservoir |
| -U·r | -* | amateur, chauffeur, connoisseur, investiture, literature, masseur |
| -U·r | -O- | your, yours, you're, yourself, yourselves (N.B. "-our" spelling) |
| | Other Vowel Shifts | |
| a | A | after, aghast, Alexander, can't, half, khaki, laugh, last |
| -a- | -e- | data, datum, patent (idea and leather), Graham (N.B. 2 syllables in UK English), scabrous, status |
| A | O | although, altar, bauxite, caulk, awful, etc. (N.B. pattern in orthography is "al", "au", "aw" in same syllabale) |
| A | @ | abolish, aquatic, dog, hot, off, etc. (N.B. pattern in orthography is "CoC" or "CaC", where C is an orthographic consonant.) |
| -A- | -o- | codicil, codify, docile, process, progress, troth |
| -aj- | -i- | albino, anti-, iodine, labyrinthine, migraine, semi-, strychnine, clientele, endive (N.B. anti- rule does not apply to antidote (US) because anti- is not a prefix.) |
| -aj- | -I- | dynasty, privacy, simultaneous, -eity (N.B. distinguishing from above rule may require case by case review.) |
| -i- | -E- | cretin, depot, ecumenical, egocentric, egotistic, etc., Oedipus, Petrarch |
| -i- | -aj- | either, neither, carbine, elephantine, philistine, saline, serpentine, mercantile (N.B. distinguishing from above rule may require case by case review.) |
| E | i | -centenary, epoch, esthete, (d)evolution, febrile, hygienic, lever, methane, predecessor |
| E- | I- | esquire, erotic, expletive |
| -e | -I | Monday, Tuesday, etc., always, holiday |
| e | -i- | beta, lingerie, theta |
| -e- | -A- | charade, esplanade, gala, promenade, stratum, tomato |
| -a- | -e- | apparatus, apricot, compatriot, comrade, paleo-, prefix, patriarchal, -otic, -otism, patronage, -ise, phalanx |
| -o- | -@- | baroque, compost, coquetry, coquette, dolorous, polka, produce (noun), protege, provost, scone, shone, sloth, sol-fa, sojourn, troll, Van Gogh, yoghurt |
| -u- | -U- | room, broom |
| -U- | -@- | grovel, hovel, hover, hovercraft |

2. Consonants and Yod-Dropping

Yod-dropping after coronals in US English is one of the most obvious differences that affects the pronunciation of a whole group of consonant phonemes: /t/, /d/, /n/, /l/, /s/, /z/, /S/, /T/, and /Z/, as more fully reflected below:

| US CPA | UK CPA | Examples |
|---|---|---|
| d | d·j | -duce affix, conduit, credulity, deuced, dew, dual, ducal, due, -due, dule, duenna, duet, dune, duo-, dupe, -dup-, dur-, duty, endure, indubitable, irreducible, mildew, obdurate |
| l | l·j | curlew, dilution, prelude |
| n | n·j | anew, annuity, avenue, continuity, denude, diminution, diminutive, enumerate, ingenuity, inure, manure, minute (adj.), -new-, nubile, neur-, neuter, neutr-, newel, nuance, nucl-, nud-, nuisance, numer-, numis-, nutrition, parvenu, penurious, pneu-, revenue |
| s | s·j | capsule, consulate, consume, consummate, insular, insuperable, marsupial, peninsula(r), pharmaceutical, pseudo-, -sume suffix |
| S | s·j | cynosure |
| z | z·j | exuberance, exude, presume |
| t | t·j | -tud-, -tun-, -tup-, -tute, -tution affixes; tuber-, tum-, -tut- prefixes and infix, angostura, centurion, costume, futurity, impromptu, intuition, obtuse, perpetuity, petunia, pituitary, quintuplets, stew, steward, stu-, tuba, tube, tubular, Tudor, Tuesday, tuition, tulip, tulle, tumid, tuna, tunic, tureen |
| T | T·j | enthuse, -iasm, etc., thews |
| tS | s·t·j or s·t·I | bastion, bestial, celestial (N.B. speaker style dependent, can list both as variations with /s·t·j/ as preferred.) |
| Z | z·j or z·I | brazier, casuist, crosier (N.B. speaker style dependent, can list both as variations with /z·j/ as preferred.) |

These rules can be fairly widely applied with two notable counter-examples: "coupon" and "erudite" which in US CPA are transcribed: /k·j·u·p·A·n/ and /E·r·j·*·d·aj·t/ respectively. The first might be regarded as a form of hyper-correction, whereby an unmotivated yod is introduced after a velar in a (mistaken) attempt perhaps to mimic French. Since no other spellings involving the string "-cou-" are pronounced /k·j/, this remains a spelling-to-sound singleton. The second may be a simple spelling (mis)pronunciation.

3. Flaps

The well-known, dialectally distinguishing realization of orthographic "d" and "t" as a flap /!/ in US English does not apply in UK English as shown below:

| US CPA | UK CPA | Examples |
|---|---|---|
| ! | t or d | better, hotter, martyr, body, odder, tardy |

The phonological rule that inserts a flap for "d"/"t" in US English may be expressed as: d, t→!/1V(C)_(C)V. UK English preserves the (underlying) /d/ and /t/ (and /n/) in these environments.

4. Fricatives and Clusters

Some differences revolve around the set of fricatives and affricates:

| US CPA | UK CPA | Examples |
|---|---|---|
| s | z | berserk, blouse, diagnose, diesel, erase, -ese (suffix), exacerbate, fuselage, houses, Leslie, mimosa, parse, talisman, valise, vase |
| S | s(j) | issue, tissue, glacier, hessian, liquorice (N.B. speaker style dependent, can list both as variations with /s/ preferred.) |
| Z | S | Asia, (-)version, cashmere, coercion, dispersion, excursion, immersion, incursion, Persia. |
| z | s | Afrikaans, asthma, naus -ea, -eate, -eous, etc., exclusive, spouse |
| Z | z | ambrosia, amnesia, anaesthesia, euthanasia, glazier, hosier, hosiery, Indonesia, osier, Parisian |
| D | T | booth, baths, cloths, earthen, moths, notwithstanding |
| t | tS | immature, maturity |
| tS | t·j | importunate (v. and n.), petulance, posthumous, prefecture, pustule, spatula, spirituous |
| tS | dZ | Norwich, Greenwich, spinach (N.B. spelling "ch" vs. above.) |
| dZ | d·j | -uous (suffix), cordial, deduce, fraudulent, glandular, incredulous, module, nodule, ordure, pendulous, pendulum, residual |
| g·z | k·s | eczema, exhortation |

5. Reduction of Unstressed Syllables

The following rules require syllabification of the underlying words. The syllabification can occur manually or automatically. In one embodiment, the US pronunciation data 110 includes syllabification information. In another embodiment, words requiring syllabification for processing are identified for manual review during processing.

| US CPA | UK CPA | Examples |
|---|---|---|
| -*·z·e·S·*·n | -aj·z·e·S·*·n | centralization, characterization, demoralization, fertilization, generalization, localization, immobilization, immunization, improvisation |
| -E·r·i | -r·i | capillary, culinary, anniversary, contemporary, and suffixes: -berry, -ary, and -ery. |
| -O·r·i | -r·i | conservatory, conciliatory, depilatory, depository, exclamatory, extemporary, inflammatory, inventory, laboratory, lavatory, mandatory, signatory |
| -b·r·o | -b·r·* | Edinburgh, Louglborough, Scarborough, etc. |
| -e·t·I·v | -*·t·I·v | authoritative, communicative, deliberative, generative, imaginative, imitative, legislative |
| -i·j·E·r·i | -*·r·i | auxiliary, aviary, beneficiary, judiciary, pecuniary |
| -e·!·I·v | -*·t·I·v | contemplative, meditative, operative, palliative (N.B. that flap rule is also being applied here) |
| -U·r | -* | miniature, temperature |
| -o- | -*- | alimony, antimony, ceremony, matrimony, patrimony, obedient, obey, pomade, thorough, volition |
| -e- | -*- | candidate, vacation |
| -u- | -*- | chartreuse, masseuse |
| -a- | -*- | baboon, -man, chagrin, circumstance, papoose, saucepan |
| -A- | -*- | Amazon (the rainforest), automaton, biathlon, capon, hexagon, etc., lexicon, marathon, triathlon, etc., occult, pantechnicon, pantheon, paragon, pentagon, phenomenon, pylon, python, silicon, tarragon, wainscot |
| -o- | -*- | borough, brimstone, brocade, chromatic, Olympic, probation, proclaim, procure, profane, profound, prohibit, proliferate, prosaic, thorough |
| -(*)·l | -aj·l | contractile, docile, domicile, facile, fissile, fragile, futile, hostile, infantile, missile, (im)mobile, nubile, projectile, puerile, reptile, sensile, servile, sterile, tactile, |

-continued

| US CPA | UK CPA | Examples |
|---|---|---|
| | | tensile, versatile, virile, volatile |

6. Miscellaneous Pronunciation Differences

In one embodiment of the invention, the CPA is extended to support representations for primary (and optionally secondary) word stress. The extension should be compatible with the underlying goals of the CPA: capable of representation with lower ASCII characters (0–127), not interfere with symbols already in use in the CPA (especially in US or UK English CPA, but also in CPA representations used for other languages), and not conflict with common notations used in phonetics. Accordingly, in one embodiment the characters "1" and "2" which are easily represented in lower ASCII characters have been selected to represent primary and secondary word stress, respectively. Compare with IPA symbols ['] and [,], respectively.

In one embodiment, the US pronunciation data 110 includes these stress characters in the augmented CPA representation. In another embodiment, the stress characters ("1" and "2") are removed in an automated fashion before pronunciations are provided to the Nuance speech recognizer version 7 to prevent the characters from causing erroneous errors. In another embodiment, the speech recognizer software is augmented to recognize the stress characters and use them appropriately in performing recognition. In another embodiment, the text-to-speech software is modified to make use of the stress characters. In another embodiment, the stress characters are provided for the benefit of human voice talent performing a script. The stress characters may enable the human voice talent to read unfamiliar words (or even familiar words with a different pronunciation in UK English) properly.

In one preferred embodiment, human voice talent parts are prepared with the expectation that they will be read by a native speaker of the respective variety of English. Accordingly, the UK script 160 would typically only show pronunciations for words with which the native speaker would be unfamiliar (e.g. outside a reference dictionary for British English). The script can be augmented by showing the correct pronunciation inline or below the respective line. In some embodiments, the UK script 160 may be being produced by a non-native producer/director and accordingly additional pronunciations may be provided in a director's version of the UK script 160 than in the version provided to the voice talent. In one embodiment, a fully pronounced version of the UK script 160 can be obtained where each line includes a full phonetic pronunciation as this may be of particular aid to a non-native director or in the case where a non-native speaker is asked to read a particular script.

The following lists several miscellaneous differences between US and UK English in pronunciation and the respective stress shifts when appropriate. ("1" shown in bold font to reduce possible confusion with capital "I" and lowercase "l" font glyphs)

| US·CPA | UK·CPA | Word |
|---|---|---|
| 1e·d·A·l·f | 1a·d·@·l·f | Adolph |
| 1a·l·m·*·n·*r | 1A·m·*·n* | almoner |
| 1a·m·p·i·r | 1a·m·p·e* | ampere |

-continued

| US·CPA | UK·CPA | Word |
|---|---|---|
| e·t | E·t | ate (Note 1) |
| a·!·*·1S·e | *1t·a·S·e | attaché |
| b·*·1l·e | 1b·a·l·e | ballet |
| 1b·a·r·I·dZ | 1b·a·r·A·Z | barrage |
| 1b·e·z·*·l | 1b·a·z·*·l | basil (herb and first name) |
| 1b·U·g·i | 1b·o·g·i | bogey |
| b·r·*·1z·i·r | 1b·r·a·z·i·* | brassiere |
| 1b·r·i·tS·I·z | 1b·r·I·tS·I·z | breeches |
| 1b·r·A·s·k | 1b·r·u·s·k | brusque |
| 1b·u·i· | 1b·Oj | buoy, -ancy, -ant |
| k·*·1f·e | 1k·a·f·e | cafe |
| 1k·a·n·!·*·l·o·p | 1k·a·n·t·*·l·u·p | cantaloupe |
| 1k·A·r·m·*·l | 1k·a·r·*·m·E·l | caramel |
| 1k·A·r·b·*·r·e·!·*r | k·A·b·*·1r·E·t·* | carburettor |
| 1k·a·r·*·l·A·n | k·*·1r·I·l·j·*·n | carillon |
| 1tS·a·z·j·*·b·*·l | 1tS·a·z·j·U·b·*·l | chasuble |
| s·I·1k·e·d·* | s·I·1k·A·d·* | cicada |
| 1k·l·a·b·*r·d | 1k·l·a·p·b·O·d | clapboard |
| 1k·l·*r·k | 1k·l·A·k | clerk |
| k·l·Oj·z·*·1n·e | k·l·w·A·1z·@·n·e | cloisonné |
| 1k·*r·n·*·l | k·*·n·*·l | colonel |
| k·*·m·1p·A·z·I·t | 1k·@·m·p·*·z·aj·t | composite (v.) |
| 1k·A·n·s·*·k·w·E·n·s | 1k·@·n·s·I·k·w·*·n·s | consequence |
| 1k·A·n·s·*·m·e | k·*·n·1s·@·m·e | consommé |
| 1k·A·n·s·t·*·b·*·l | 1k·ˆ·n·s·t·*·b·*·l | constable |
| k·O·r·1n·E·t | 1k·O·n·I·t | cornet |
| k·O·r·*·l·E·r·i | k·*·1r·@·*·r·i | corollary |
| 1k·A·z·m·o·s | 1k·@·z·m·@·s | cosmos |
| 1k·o·v·*r·t | 1k·ˆ·v·*·t | covert |
| 1k·j·u·p·A·n | 1k·u·p·A·n | coupon |
| 1k·O·r·!·I·z·*·n | k·O·t·I·z·a·n | courtesan |
| 1k·aj·o·!·i | 1k·Oj·o·t·i | coyote |
| 1k·u·k·u· | 1k·U·k·u | cuckoo |
| 1d·A·k·s·h·U·n·d | 1d·a·k·s·*·n·d | dachshund |
| 1d·a·l·j·* | 1d·e·l·I·* | dahlia |
| 1d·*·r·b·i | 1d·A·b·i | derby |
| l·1l·i·t | e·1l·i·t | élite |
| 1E·r·* | 1·i·*·r·* | era |
| 1Er | 13 | err |
| l1r·e·S·*r | l·1r·e·Z·* | erasure |
| 1E·s·k·w·aj·*r | l·1s·k·w·aj·* | esquire |
| f·*·1k·i·r | 1f·e·k·i·* | fakir |
| 1f·I·g·j·*r | 1f·I·g·* | figure, figurative, etc. |
| f·I·n·*·n·1s·I·r | f·aj·1n·a·n·s·i·* | financier |
| 1f·l·u·t·I·s·t | 1f·l·O·t·I·st | flautist |
| 1f·O·r·h·E·d | 1f·@·r·I·d | forehead |
| 1f·O·r·t | f·O·r·1t·e | forte |
| 1f·Oj·*r | 1F·Oj·e | foyer |
| 1f·r·e·k·*·s | 1f·r·a·k·A | fracas |
| 1f·j·U·r·*r | f·j·u·1r·O·r·i | furore |
| g·*·1r·A·z | 1g·a·r·I·dZ | garage |
| dZ·*·1l·a·!·n·*·s | dZ·*·1l·a·t·I·n·*·s | gelatinous (Note 2) |
| 1g·l·u·!·n·*·s | 1g·l·u·t·I·n·*·s | glutinous (Note 2) |
| 1g·u·s·b·E·r·i | 1g·U·z·b·r·i· | gooseberry |
| 1g·O·r·d | 1g·u·*·d | gourd |
| 1g·r·I·m·I·s | g·r·I·1m·e·s | grimace (v., n.) |
| 1h·E·r·*·m | 1h·A·r·i·m | harem |
| 1h·E·k·t·*r | 1h·E·k·t·E·* | hectare |
| *r·b | h·3·b | herb, herbal etc. |
| 1h·i·#·r·o | 1h·I·r·#o | hero (Note 3) |
| h·U·f,·h·U·v·z | h·u·f,·h·u·v·z | hoof, hooves |
| 1h·aw·s·w·aj·f·*·r·i | 1h·aw·s·w·I·f·r·i | housewifery |
| 1h·*r·I·k·e·n | 1h·ˆ·r·I·k·*·n | hurricane |
| 1h·aj·p·A·t·n·us | 1h·aj·p·@·t·I·n·j·u·z | hypotenuse |
| 1aj·d·I·l·(-I·k) | 1I·d·I·l·(-I·k) | idyll, idyllic |
| I·1l·ˆ·s·t·r·*·!·I·v | 1I·l·*·s·t·r·*·t·I·v | illustrative |
| 1l·m·b·*·s·I·l | 1l·m·b·*·s·i·l | imbecile |
| I·m·1p·a·s | 1a·m·p·A·s | impasse |
| I·m·2p·r·A·v·I·1z·e·S·*·n | I·m·p·r·*·v·aj·1z·e·S·*·n | improvisation |
| 1a·n·dZ·*·n·u | 1a·Z·*·n·j·u | ingenue |
| 1I·n·s·*·l·*r | 1I·n·s·j·U·l·* | insular |
| 1I·n·s·*·l·I·n | 1I·n·s·j·U·l·I·n | insulin |
| I·n·!·*·r·1n·i·s·*n | I·n·t·*·1n·i·s·aj·n | internecine |
| I·n·1v·e·g·*·l | I·n·1v·i·g·*·l | inveigle |
| 1dZ·a·g·w·A·r | 1dZ·a·g·j·u·* | jaguar |

-continued

| US·CPA | UK·CPA | Word |
|---|---|---|
| k·*·1l·A·m·*·t·*r | 1k·I·l·*·m·i·t·* | kilometre |
| 1l·a·b·r·*·t·O·r·i | l·*·1b·@·r·*·t·r·i | laboratory |
| 1l·a·!·n | 1l·a·t·I·n | Latin (Note 2) |
| 1·li·Z·*r | 1l·E·Z·* | leisure |
| 1l·i·*·z·A·n | l·i·1e·z·*·n | liaison |
| l·u·1t·E·n·*·n·t | l·E·f·1t·E·n·*·n·t | lieutenant |
| 1l·aj·l·a·k | 1l·aj·l·*k | lilac |
| 1·I·1k·*r | l·I·1k·j·u* | liqueur |
| 1l·O·g~·dZ·I·t·u·d | 1l·@·n·dZ·I·t·j·u·d | longitude |
| m·*1k·A·b·*r | m*·1k·A·b·r | macabre |
| m·a·t·1n·e | 1m·a·t·I·n·e | matinée |
| 1m·E·d·I·s·*·n | 1m·E·d·s·I·n | medicine (Note 4) |
| 1m·e·l·e | 1m·E·l·e | melée |
| 1m·E·t·*·l·*·r·dZ·I·st | m·*·1t·a·l·*·dZ·I·s·t | metallurgist, -urgy |
| 1m·E·z·*·n·i·n | 1m·E·t·s·*·n·i·n | mezzanine |
| 1m·I·d·w·aj·f·*r·i | m·I·d·1w·I·f·r·i | midwifery |
| m·i·1l·j·u | 1m·I·l·j·* | milieu |
| 1m·I·s·*·l·e·n·i | m·I·1s·E·l·*·n·i | miscellany |
| 1m·o·k·* | 1m·@·k·* | mocha |
| 1m·O·r·I·b·*·n·d | 1m·@·r·I·b·*·n·d | moribund |
| m·aw·n·t·n·1i·r | m·aw·n·t·I·1n·i* | mountaineer |
| 1m· ˆ ·s·t·a·S | m·*·1s·t·A·S | moustache |
| n·A·n·S·*·1l·A·n·t | 1n·@·n·S·*·l·*·n·t | nonchalant |
| 1n·A·n·s·E·n·s | 1n·@·n·s·*·n·s | nonsense |
| 1n·u·g·*·t | 1n·u·g·A | nougat |
| o·1m·e·g·* | 1o·m·I·g·* | omega |
| 1o·m·*·n | 1o·m·E·n | omen |
| 1As·p·r·i | 1@·s·p·r·e | osprey |
| 1p·A·p·A | p·*·1p·A | papa |
| p*1p·r·i·k·* | 1p·a·p·r·I·k·* | paprika |
| p·A·1t·e | 1p·a·t·e | paté |
| f·I·z·i·1A·g·n·*·m·i | f·I·z·i·1@·n·*·m·i | physiognomy |
| 1p·r·i·m·*·t·U·r | 1p·r·E·m·*·tS·* | premature |
| p·r·*·1m·i·r | 1p·r·E·m·i* | premier |
| p·r·*·1m·i·*r | 1p·r·E·m·i·e* | première |
| 1p·u·m·* | 1p·j·u·m·* | puma |
| 1k·w·aj·n·aj·n | k·w·I·1n·i·n | quinine |
| r·I·m·A·n·s·t·r·e·t | 1r·E·m·*·n·s·t·r·e·t | remonstrate |
| 1r·E·n·*·s·A·n·s | r·I·1n·e·s·*·n·s | renaissance |
| 1r·E·s·t·*r·*·n·t | 1r·E·s·t·*·r·@·n·t | restaurant |
| 1r·E·v·*·l·i | r·I·1v·a·l·i | reveille |
| 1s·e·n·t·(Name) | 1s·*·n·t·(Name) | Saint |
| s·e·1t·a·n·*·k | s·*·1t·a·n·I·k | satanic |
| s·*·1v·A·n·t | 1s·a·v·*·n·t | savant |
| 1s·k·E·dZ·u·l | 1S·E·d·j·u·l | schedule |
| 1s·E·k·*·n·d·(v.) | s·I·1k·@·n·d·(v.) | second |
| 1S·i·k | 1S·e·k | sheik |
| 1s·l·u· | 1s·l·aw | slough |
| 1s·A·d·*r | 1s·o·l·d·* | solder |
| 1s·p·E·S·*·l·t·i· | s·p·E·S·I·1a·l·I·t·i | specialty/speciality |
| 1s·k·w·*r·l | 1s·k·w·I·r·*·l | squirrel |
| 1s·t·*r·*·p | 1s·t·I·r·*·p | stirrup |
| s·*·1b·O·l·t·*r·n | 1s· ˆ ·b·*·l·t·*·n | subaltern |
| s·*·g·1dZ·E·s·t | s·*·1dZ·E·s·t | suggest |
| t·a·1tu | t·*·1t·u | tattoo |
| t·E·m·p·*1r·E·r·I·l·i | 1t·E·m·p·r·*·l·i | temporarily |
| 1T·e·!·* | 1T·i·t·* | theta |
| 1T·I·T·*r | 1D·I·D·* | thither |
| 1t·O·r·d·z | t·*·1w·O·d·z | towards |
| 1t·r·e·k·i·* | t·r·*·1k·i·* | trachea |
| t·r·a·1p·i·z | t·r·*1p·i·z | trapeze |
| 1t·r·aw·m·* | 1t·r·O·m·* | trauma |
| 1t·r·aj·k· ˆ ·l·*r | 1t·r·I·k·*·l·* | tricolour |
| 1· ˆ ·n·dZ·*·l·e·t | 1· ˆ ·n·d·j·u·l·e·t | undulate |
| ˆ ·n·1E·r·I·g~ | ˆ ·n·13·r·I·g~ | unerring |
| ˆ ·n·1t·O·r·d | ˆ ·n·t·*·1w·O·d | untoward |
| v·e·s | v·A·z | vase |
| v·*r·1m·u·T | 1v·3·m·*·T | vermouth |
| v·*·1s·I·s·I·t·u·d | v·aj·1s·I·s·I·t·j·u·d | vicissitude |
| 1v·aj·!·*·m·*·n | 1v·I·t·*·m·I·n | vitamin |
| 1v·o·k·s·w·a·g·*·n | 1f·o·k·s·v·A·g·*·n | Volkswagen |
| 1v·A·l·j·*·m | 1v·@·l·j·u·m | volume |
| 1w·e·s·t·k·o·t | 1w·E·s·k·I·t | waistcoat |
| 1h·u·p | 1·w·u·p | whoop |
| 1w·I·g·w·A·m | 1w·I·g·w·a·m | wigwam |
| 1w·*r·s·t·E·d | 1w·U·s·t·I·d | worsted (cloth) |
| 1r·A·T | 1r·@·T | wrath |

-continued

| US·CPA | UK·CPA | Word |
|---|---|---|
| 1z·i | 1z·E·d | z |
| 1z·i·b·r·* | 1z·E·b·r·* | zebra |
| 1z·i·n·I·T· | 1z·E·n·I·T | zenith |
| 1z·i·#r·o | 1z·i*·r#o | zero (Note 3) |

Notes: (1) The prestige pronunciations of the past participle of the verb 'eat' are reversed in US and UK English. (2) Most US adjectival forms like '-inous' will elide the penultimate vowel, thus reducing the penultimate syllable to a syllabic consonant only. UK English retains the full syllable. The same applies to disyllabic words, where the second syllable is '-tin, -ton, -din, -don', etc. (3) Compare 'zero' for similar morphological splitting (cf. Wells, 1982b). (4) 'Medicine' normally has only two syllables in UK English.

7. R-Dissimilation

There are some cases in which the historical /r/ of US English has been dropped, accordingly some words are more similar than might otherwise be expected in US-UK pronunciations.

| US·CPA | UK·CPA | Word |
|---|---|---|
| 1g· ˆ ·v·*·n·*r | 1g· ˆ ·v·*·n·* | governor |
| s·*·1p·r·aj·z | s·*·1p·r·aj·z | surprise |

See also WELLS, J. C. (1982b) *Accents of English 3: Beyond the British Isles*. Cambridge, Cambridge University Press, p.490. However, some examples provided by Wells in this category do not have non-rhotic US English versions published in his (1990) *Pronunciation Dictionary*. Accordingly, this pattern may be regarded as variable at least, and perhaps idiosyncratic. In one embodiment, it is implemented as a look up table of R-dissimilated words. In another embodiment, there is no special treatment of these words since the other rules provided above will handle them satisfactorily.

E. Lexical Stress Shifts

Many words have significant stress shifts that are also expression in different pronunciations, centered around the (non-)reduction of vowels. The following lists several examples of such stress shifts and exceptions. The appropriate changes between stressed and unstressed vowels can then be made in accordance with the stress shift.

| US version | UK version |
|---|---|
| adver1tisement | ad1vertisement |
| 1ally (v.) | al1ly (v.) |
| 1apple sauce | apple 1sauce (Note 1) |
| a1ristocrat | 1aristocrat |
| ba1llet | 1ballet (Note 2) |
| 1ballyhoo | bally1hoo |
| 1Bangkok | Bang1kok (Note 3) |
| Ber1nard | 1Bernard (Note 4) |
| 1berserk | ber1serk |
| ca1ffeine | 1caffeine |
| 1capillary | ca1pillary |
| 1castrate | cas1trate |
| 1cigarette | cigar1ette |
| com1bat (v.) | 1combat (v.) |

-continued

| US version | UK version |
|---|---|
| com1batant | 1combatant |
| com1bative | 1combative |
| com1pensatory | compen1satory |
| com1plex (adj.) | 1complex (adj.) |
| com1posite (adj.) | 1composite (adj.) |
| 1constitutive | con1stitutive |
| de1tail (n. and v.) | 1detail (n. and v.) |
| 1dictate (v.) | dic1tate (v.) |
| dis1locate | 1dislocate |
| 1donate | do1nate |
| e1longate | 1elongate |
| 1extant | ex1tant |
| fron1tier | 1frontier |
| 1frustrated | fru1strated |
| 1gyrate | gy1rate |
| ha1rass | 1harass |
| impor1tune | 1importune |
| im1pregnate | 1impregnate |
| in1culcate | 1inculcate |
| in1culpate | 1inculpate |
| in1filtrate | 1infiltrate |
| 1locate | lo1cate |
| 1magazine | maga1zine |
| 1mamma | mam1ma |
| 1manganese | manga1nese |
| 1margarine | marga1rine |
| ma1ssage | 1massage |
| 1mayonnaise | mayonn1aise |
| 1mayoress | mayr1ess |
| 1migrate | mi1grate |
| obo1lete | 1obsolete |
| o1regano | ore1gano |
| pall1iasse | 1palliasse |
| 1partisan | parti1san |
| pas1tel | 1pastel |
| pa1tina | 1patina |
| per1mit (n.) | 1permit (n.) |
| 1placate | pla1cate |
| pre1ferably | 1preferably |
| pro1lix | 1prolix |
| 1prospect (v.) | pro1spect (v.) |
| 1prospector | pro1spector |
| 1protest (v.) | pro1test (v.) |
| 1pulsate | pul1sate |
| pur1port (v.) | 1purport (v.) |
| 1quadrate | quad1rate |
| 1quatenary | qua1tenary |
| 1refugee | refu1gee |
| 1research | re1search |
| 1rotate | rot1ate |
| sta1lacmite | 1stalacmite |
| sta1lagmite | 1stalagmite |
| 1spectator | spec1tator |
| 1solitaire | soli1taire |
| 1serrated | ser1rated |
| 1strip-search | strip-1search |
| 1submarine | subma1rine |
| 1tangerine | tan1gerine |
| 1testator | test1ator |
| 1truncate | trun1cate |
| 1vacate | va1cate |
| va1gary | 1vagary |
| 1vibrate | vib1rate |
| 1waste paper | waste 1paper (Note 1) |

Notes: (1) Most nominal compounds of this type are stressed on the first syllable in US English, and the second in UK English, cf: "ice cream", "blue jeans", "cream cheese".

(2) The great majority of "borrowed" French disyllabic words are stressed on the final syllable in US English, and the first in UK English, cf:

| appliqué | château | ennui | nouveau | rapport |
|---|---|---|---|---|
| attaché | chauffeur | enpassant | outré | rapprochement |
| ballet | cloisonné | entrée | parquet | Renault |
| baton | comedienne | exposé | passé | retrousée |
| beret | consommé | fiancé(e) | pastille | risqué |
| blasé | coupé | fillet | pâté | sachet |
| bonhomie | crochet | gâteau | peignoir | sauté |
| boudoir | croquet | gaucherie | perfume | son et lumière |
| brassière | cure | massage | Peugeot | sorbet |
| brochure | debris | matinée | pierrot | soufflé |
| buffet | début | mélange | piqué | souvenir |
| cabaret | décolleté | melée | plateau | tableau |
| cachet | décor | ménage | pot-pourri | toupé |
| café | démodé | métier | précis | trousseau |
| chagrin | dénouement | milieu | protégé | valet |
| chalet | dressage | mirage | purée | |
| chamois | élite | négligé | ragout | |

A couple of notable exceptions to the fairly comprehensive list above are "débutante" and "résumé", which are both stressed on the first syllable in US English. While not commonly used in UK English ("curriculum vitae", or "c.v." being preferred, see above), "résumé" is stressed on the first syllable. The lack of alternative words and full lexicalization of both probably accounts for the departure from the "French" pattern for US English.

Also note that on the whole, UK English retains the accents in the orthographic versions of the items in the above list, whereas US English has dispensed with them, or uses them unpredictably (or wrongly), e.g. the various forms of "résumé" that are found commonly: "résume", "resumé", and "resume". See Trudgill and Hannah (1994, p.86)

French personal names also receive stress on the first syllable in UK English, but the second in US English: Chopin, Degas, Monet, Renoir, etc. In one embodiment, these rules are applied using one or more tables of common borrowed French words and names. In another embodiment, the US pronunciation data 110 may include etymological information. In another embodiment, the etymological information is referenced from another source.

(3) Many polysyllabic foreign place names and derived adjectives are stressed on the first syllable in US English, and the second in UK English, cf: Azores, Baghdad, Belfast, Beyreuth, Bucharest, Budapest, Byzantine, Calais, Caracas, Caribbean, Himalayas, Hong Kong, and Singapore. Curaçao is an exception to this rule: US Cura1çao vs. UK 1Curaçao.

(4) Many common English first names are stressed differently, with primary stress on the second syllable in US English, and the first in UK English, cf: Charlene, Doreen, Eileen, Eugene, Irene, Kathleen.

F. Implementation Concerns

The above rules can be described through one or more of regular expression substitutions, productions (e.g. this sequence of symbols becomes this), and/or rules (e.g. as described above in an appropriate form for computer implementation).

The rules that do not require syllabification or determination of parts of speech can generally be implemented with straightforward regular expressions matching on a mixture of the orthography and the corresponding transcription. Rules that require syllabification (as well as determination of stress, etymology, or part of speech) may also require regular expression matching on such a representation.

Some care can be taken to ensure that multiple rules can be applied to a word or phrase, e.g. spelling of "maneuver" as "manoeuvre" in UK English, which would require pattern matching both for the trailing "-er" spelling and separately pattern matching for the Greek etymology and the replacement of the lexical "-e-" in US English with the original "oe" spelling. Similar pattern matching can be done to correct the transcriptions, e.g. a flap, /!/, in a US English transcription can simply be replaced by the appropriate /t/ or /d/ according to the spelling.

G. Web Based Interface

Individual application programmers that are developing voice applications may encounter several problems as they try to internationalize their voice applications. Further, despite their closeness as varieties of a single language the above tables and discussion show that US and UK English include significant variations in pronunciation, spelling and word choice. Individual developers may lack adequate resources, knowledge, and expertise to easily transform their application from US to UK English.

Accordingly, in some embodiments of the invention, a web based interface is provided to allow users to submit scripts and grammars—either explicitly or implicitly—for conversion. In one embodiment, the submission is explicit, e.g. US grammar 102 is submitted, using one or more standard web based formats (e.g. URL of US grammar 102, HTTP file upload of US grammar 102, direct entry of US grammar 102 into an HTML form, etc.). In other embodiments, the script or grammar is derived from analysis of application program code such as grammars in an application. For example, if an application programmer provides the application program code for an application, the grammars identified in the application could be treated as the US grammars 102.

If a web-based voice application development environment is provided (see for example, U.S. patent application Ser. No. 09/592,241 entitled "Method and Apparatus for Zero-Footprint Phone Application Development", filed Jun. 13, 2000, having inventors Kunins, Jeff C., et. al., and assigned to the assignee of the present invention) then either the implicit or explicit approach can be integrated with such an environment. Additionally, the US-to-UK conversion can be used in conjunction with web based phonemic transcription services (see for example, U.S. patent application Ser. No. 09/721,373, entitled "Automated Creation of Phonemic Variations", filed Nov. 22, 2000, having inventor Caroline G. Henton).

In one embodiment, the conversion service is provided as a paid-for service to developers. In another embodiment, developers are provided a limited quantity of free conversions (e.g. a certain number of grammars or lines of scripts). In yet another embodiment, different prices are charged whether or not human intervention is required (e.g. fully automatic conversions are free, but those requiring human intervention are charged). In some embodiments, developers are not provided access to the resulting UK phonemic transcriptions. In some embodiments, grammars and scripts are batched across multiple developers, e.g. from their applications and grammars and those words that appear in at least N different locations are sent for conversion (possibly without notification to the respective developers).

Because of the competitive value of good pronunciations to the operator of a voice platform, in some embodiments, developers may only access the US/UK pronunciations for those words they have paid for transcription. Thus in such an embodiment, if developer X has "Kodak" transcribed she can see the pronunciation she paid for (or requested/received free). But developer Y cannot (unless she pays for transcription of the word, etc.) Similarly, if a developer of a time of day application had "Greenwich" transcribed for US English they may be required to pay separately for the UK English transcription.

H. Conclusion

In some embodiments, processes of FIG. 1 can be implemented using hardware based approaches, software based approaches, and/or a combination of the two. In some embodiments, phonemic transcription, textual normalization, spelling normalization, lexical normalization, phonemic conversion, and lexical stress shifts are carried out using one or more computer programs that are included in one or more computer usable media such as CD-ROMs, floppy disks, or other media. In some embodiments, conversion programs, script handling programs, spelling conversion programs, and/or syllabification programs, are included in one or more computer usable media.

Some embodiments of the invention are included in an electromagnetic wave form. The electromagnetic waveform comprises information such as US-to-UK conversion programs, script handling programs, and/or syllabification programs. The electromagnetic waveform may include the programs accessed over a network.

The foregoing description of various embodiments of the invention has been presented for purposes of illustration and description. It is not intended to limit the invention to the precise forms disclosed. Many modifications and equivalent arrangements will be apparent.

What is claimed is:

1. A method of generating a British English phonemic transcription from a word and an American English phonemic transcription of the word using a computer system:

providing the word to a first computer program, the first computer program transforming the spelling of the word according to British English spelling conventions;

providing the word to a second computer program, the second computer program for lexically transforming the word to a semantically equivalent word used in British English and marking the word when no semantic equivalent is found and when the semantic equivalent cannot be identified; and applying phoneme conversion rules with a third computer program to transform an American English phonemic transcription of the semantically equivalent word to the British English phonemic transcription.

2. The method of claim 1, wherein the first computer program, the second computer program and the third computer program operate without use of a dictionary of British English or a comprehensive word list for British English showing one or more of spelling, pronunciation, and word stress.

3. The method of claim 1, wherein the first computer program uses a table comprising rules applicable to certain orthographic forms of the word to produce the British English Spelling.

4. The method of claim 1, wherein the first computer program includes an ad hoc table of a limited number of ad hoc spelling differences between American and British English that are not easily expressed in meaningful orthographic transformation rules, the table not including more than one hundred (100) words.

5. The method of claim 1, wherein the second computer program includes an ad hoc table of ad hoc lexical differences between American and British English, the ad hoc table including lists of words specific to specific areas selected from the set of financial terms, units of measure, musical notation, automotive terms, betting terms, botanical and zoological terms, food names, slang terms, cricket and sports terms, traffic terms, and/or miscellaneous common terms.

6. The method of claim 1, wherein when the second computer program transforms the word to a semantically equivalent word, the American English phonemic transcription is similarly replaced with an American English phonemic transcription for the semantically equivalent word.

7. The method of claim 1, wherein when the second program provides for interactive input and adjustment to marked words prior to the application of the third computer program.

8. The method of claim 1, wherein the American English phonemic transcription is represented according to the Computer Phonetic Alphabet (CPA) for American English and wherein the British English phonemic transcription is represented according to the CPA for British English.

9. The method of claim 8, wherein the CPA representations of phonemic transcriptions indicate primary and secondary word stress.

10. The method of claim 9, wherein the CPA representation of primary and secondary word stress uses lower ASCII character symbols that are not used in either the CPA for American English or the CPA for British English.

11. The method of claim 9, wherein the third computer program uses changed word stress between American English and British English to transform the American English phonemic transcription to the British English phonemic transcription.

12. The method of claim 11, wherein changed word stress determined according to one or more rules and an ad hoc table of changed word stress.

13. An apparatus for transforming a voice application prepared for American English speakers for use by British English speakers, the apparatus comprising:

a first means for analyzing the voice application to identify one or more scripts and one or more grammars, the one or more scripts corresponding to textual material for presentation by one of a text-to-speech system and a human voice talent, the one or more grammars corresponding to descriptions of words that the voice application must be capable of responding to in one or more states;

a second means for automatically performing spelling and lexical normalization of the one or more scripts and the one or more grammars from American English to British English, the normalization producing one or more predetermined markings, the markings being indicative of words likely to require manual review;

a third means for permitting manual review of the normalized scripts and grammars; and a fourth means for performing phonemic conversions for words in the scripts and the grammars from American English pronunciations to British English pronunciations.

14. The apparatus of claim 13, further comprising a fifth means for generating an augmented script, the augmented script including British English pronunciation for at least one word.

15. The apparatus of claim 13, further comprising a fifth means for providing a web based interface to the first, second, third and fourth means and wherein the third means is adapted to perform in a web based environment.

16. The apparatus of claim 13, further comprising a fifth means for automatically applying the first, second, third, and fourth means to a voice application without an explicit request to transform the voice application.

* * * * *